US011966677B1

(12) United States Patent
Goveas et al.

(10) Patent No.: US 11,966,677 B1
(45) Date of Patent: Apr. 23, 2024

(54) EMULATION PERFORMANCE ANALYSIS USING ABSTRACT TIMING GRAPH REPRESENTATION

(71) Applicant: Synopsys, Inc., Mountain View, CA (US)

(72) Inventors: Melvyn Goveas, Orangevale, CA (US); Ribhu Mittal, Portland, OR (US); Wen-Chi Feng, San Jose, CA (US); Yanhua Yi, Cupertino, CA (US)

(73) Assignee: SYNOPSYS, INC., Sunnyvale, CA (US)

( * ) Notice: Subject to any disclaimer, the term of this patent is extended or adjusted under 35 U.S.C. 154(b) by 298 days.

(21) Appl. No.: 17/462,775

(22) Filed: Aug. 31, 2021

Related U.S. Application Data

(60) Provisional application No. 63/121,685, filed on Dec. 4, 2020, provisional application No. 63/072,732, filed on Aug. 31, 2020.

(51) Int. Cl.
*G06F 30/3312* (2020.01)
*G06F 30/394* (2020.01)
*G06F 119/12* (2020.01)

(52) U.S. Cl.
CPC ........ *G06F 30/3312* (2020.01); *G06F 30/394* (2020.01); *G06F 2119/12* (2020.01)

(58) Field of Classification Search
USPC ........................................................ 716/113
See application file for complete search history.

(56) References Cited

U.S. PATENT DOCUMENTS

| | | | | |
|---|---|---|---|---|
| 2013/0300463 | A1* | 11/2013 | Gemmeke | G06F 1/3296 716/108 |
| 2014/0143744 | A1* | 5/2014 | Dimond | G06F 30/34 716/105 |
| 2015/0121328 | A1* | 4/2015 | Segal | G06F 30/398 716/113 |
| 2017/0140089 | A1* | 5/2017 | Hathaway | G06F 30/398 |
| 2019/0227536 | A1* | 7/2019 | Cella | G05B 23/0286 |

* cited by examiner

*Primary Examiner* — Mohammed Alam
(74) *Attorney, Agent, or Firm* — LEWIS ROCA ROTHGERBER CHRISTIE LLP

(57) ABSTRACT

A method is disclosed. The method includes computing a time delay for each path of a plurality of paths of a circuit design and determining a commonality score based on a number of segments that are common between the plurality of paths of the circuit design. The method further includes determining a criticality score based on the time delay for each path of the plurality of paths of the circuit design. The method further includes generating a graphical representation of the plurality of paths, wherein a first dimension of the graphical representation corresponds to the commonality score and wherein a second dimension of the graphical representation corresponds to the criticality score. The method further includes providing the graphical representation of the plurality of paths in a graphical user interface (GUI) to represent the plurality of paths in the circuit design.

20 Claims, 13 Drawing Sheets

| FPGA | Signal Name | Arrival | Delay | Mux Ratio | FPGA Port Name | Netlist name |
|---|---|---|---|---|---|---|
| + U0_M0_F1 | Top.a.b.c.s1 | 260 ns | | <n> | <Port1> | <Name1> |
| U0_M0_F1 -> U0_M0_F2 | FPGA Crossing | 270 ns | 10 ns | <n> | -NA- | -NA- |
| U0_M0_F2 | Feedthrough | 275 ns | 5 ns | <n> | <Port2> | <Name2> |
| U0_M0_F2 -> U1_M1_F3 | Unit Crossing | 289 ns | 14 ns | <n> | -NA- | -NA- |
| − U1_M1_F3 | Top.a.d.e1 | 300 ns | 11 ns | <n> | <Port3> | <Name3> |
| U1_M1_F3 | <Top.tool_wire_random> | -NA- | -NA- | -NA- | -NA- | <Name4> |
| U1_M1_F3 | Top.a.d.e2 | -NA- | -NA- | -NA- | -NA- | <Name5> |
| U1_M1_F3 | Top.a.d.e3 | -NA- | -NA- | -NA- | -NA- | <Name6> |
| U1_M1_F3 -> U1_M2_F4 | Module Crossing | 339 ns | 39 ns | <n> | -NA- | -NA- |
| + U1_M2_F4 | Top.g.foo[1] | 391 ns | 52 ns | <n> | <Port4> | <Name7> |

FIG. 6

EMULATION PERFORMANCE ANALYSIS USING ABSTRACT TIMING GRAPH REPRESENTATION

RELATED APPLICATIONS

The present application claims priority under 35 U.S.C. § 119(e) to U.S. Provisional Patent Application No. 63/072,732, titled "Abstract Timing Graph Representation for Emulation Performance Analysis" and filed on Aug. 31, 2020; and U.S. Provisional Patent Application No. 63/121,685, titled "Multiple Interlinked Views of Emulation Timing Paths Across Emulator Hardware and Design Hierarchies" and filed on Dec. 4, 2020, which are hereby incorporated by reference in their entireties for all purposes.

FIELD

The present application generally relates to an electronic design automation (EDA) system. In particular, the present application is related to a system and method for emulation performance analysis using a timing graph representation.

BACKGROUND

Performance is one of the strongest value propositions for an emulation platform because higher speed enables better validation coverage at a lower cost. The focus is typically limited to using the latest generation of hardware or manufacturing technology, latest software improvements, and/or design knowledge to guide the software to achieve higher performance.

Carrying out user-guided performance improvements is an extremely complex and effort-intensive process. Deep knowledge of software as well as design architecture, including physical characteristics of the emulation platform, is needed in order to produce a successful strategy. There is a strong need to have the right analytical tools to review and analyze performance bottlenecks.

Existing emulation performance reports fail to effectively communicate critical bottlenecks in the system. Generally, the problem data set is very large to begin with, and the existing format includes a lot of low-level detail, some of which may or may not be relevant, and floods the user with excessive information that can make it harder to appreciate a big picture view. Further, most of the information is provided in terms of internal emulator representation, making it extremely difficult to connect the information back to an original design.

While the current format of the emulation platform report includes timing information for links in the emulation system, it is presented as low-level textual information, and the user has to manually visualize how critical paths may be mapped across the emulation system. The user has to manually parse every line in the report to find the root cause for a performance slowdown. This may be tedious, time-consuming, and error-prone work.

SUMMARY

In one embodiment, a method is disclosed. The method is performed by one or more processing devices. The method includes computing a time delay for each path of a plurality of paths of a circuit design. The method further includes determining a commonality score based on a number of segments that are common between the plurality of paths of the circuit design and determining a criticality score based on the time delay for each path of the plurality of paths of the circuit design. The method further includes generating a graphical representation of the plurality of paths, where a first dimension of the graphical representation corresponds to the commonality score and a second dimension of the graphical representation corresponds to the criticality score. The method further includes providing the graphical representation of the plurality of paths in a graphical user interface (GUI) to represent the plurality of paths in the circuit design.

In another embodiment, a system is disclosed. The system includes a memory configured to store operations, and one or more processors configured to perform the operations. The operations include computing a time delay for each path of a plurality of paths of a circuit design. The operations further include determining a commonality score based on a number of segments that are common between the plurality of paths of the circuit design and a criticality score based on the time delay for each path of the plurality of paths of the circuit design. The operations further include generating a graphical representation of the plurality of paths, where a first dimension of the graphical representation corresponds to the commonality score and a second dimension of the graphical representation corresponds to the criticality score. The operations further include providing the graphical representation of the plurality of paths in a graphical user interface (GUI) to represent the plurality of paths in the circuit design.

In yet another embodiment, a non-transitory, tangible computer-readable device having instructions stored thereon is disclosed. The instructions, when executed by at least one computing device, causes the at least one computing device to perform operations including computing a time delay for each path of a plurality of paths of a circuit design. Each path includes an entry point and an exit point on the circuit design. The operations include determining a commonality score based on a number of segments that are common between the plurality of paths of the circuit design and determining a criticality score based on the time delay for each path of the plurality of paths of the circuit design. The operations further include generating a graphical representation of the plurality of paths, where a first dimension of the graphical representation corresponds to the commonality score and a second dimension of the graphical representation corresponds to the criticality score. The operations further include providing the graphical representation of the plurality of paths in a graphical user interface (GUI) to represent the plurality of paths in the circuit design.

BRIEF DESCRIPTION OF THE DRAWINGS/FIGURES

The following Detailed Description, Figures, appended Additional Figures and appended Claims signify the nature and advantages of the innovations, embodiments and/or examples of the claimed inventions. All of the Figures signify innovations, embodiments, and/or examples of the claimed inventions for purposes of illustration only and do not limit the scope of the claimed inventions. Such figures are not necessarily drawn to scale and are part of the disclosure.

In the Figures, similar components or features may have the same, or similar, reference signs in the form of labels (such as alphanumeric symbols, e.g., reference numerals), and may signify similar or equivalent functionality. Further, various components of the same type may be distinguished by following the reference label by a dash and a second label that distinguishes among the similar components. If only the first reference label is used in the specification, the description is applicable to any one of the similar components having the same first reference label irrespective of the second reference label. A brief description of the Figures is below.

FIG. 6 illustrates a design view of a selected segment of a path, in accordance with some embodiments.

Figure 1:
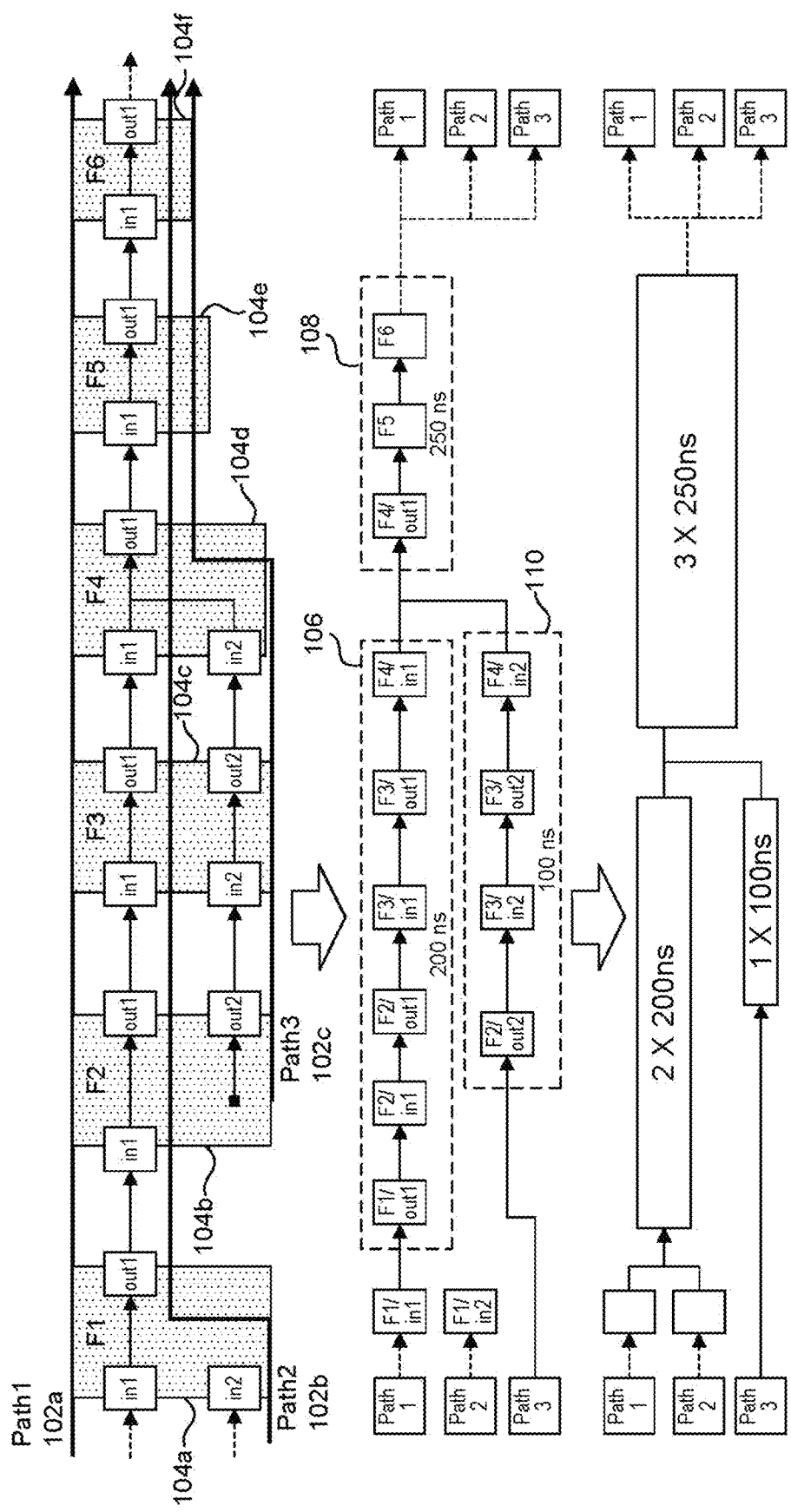
FIG. 1 illustrates criticality and commonality computation for timing paths, according to an embodiment of the present disclosure.

In such various figures, reference signs may be omitted as is consistent with accepted engineering practice; however, one of ordinary skill in the art will understand that the illustrated components are readily understood when viewed in the context of the illustration as a whole and the accompanying disclosure describing such various figures

DETAILED DESCRIPTION

The present disclosure is directed generally to a graph representation of timing analysis data for a device under test (DUT). Approaches described herein address problems with the current emulation tools that provide users with excessive information. This information clutter makes analysis of test reports difficult to carry out effectively, and therefore it is challenging to rely on this information to correct an issue with the DUT.

By building a high-level graph according to various embodiments described herein, a user may identify key performance bottlenecks without having to look at, let alone deeply understand, low-level tool or software details. With a tool-agnostic representation of the timing analysis data, a pathway is provided for understanding how tool results can be improved through design level actions in the user domain. This approach reduces dependency on tool experts, enabling a wide user base to analyze and improve emulation performance.

Existing tools severely lack in the effective analysis. Existing reports are presented as a collection of individual critical timing paths. There are several problems with this representation:

1 Users typically need to visualize the whole problem to address it effectively. However, users are presented with slivers of the data at a time (timing paths are single-dimensional slices of a two-dimensional data space) and have to build the full picture in their heads.

2, The problem data set is very large, and the individual timing path representation inherently depicts low-level details, resulting in an excessive amount of data thrown at the user (much of which is not needed upfront), making it even harder to see the big picture.

3. The individual timing path representation tends to encourage users to serialize their mental processing, and often users will tend to look at the top few paths, instead of scanning the full set to understand the problem sufficiently.

4. The individual timing path representation does not explicitly show relationships between paths. These relationships are important to comprehend in order to address the problem holistically. For example, it is typical that multiple timing paths share common segments, and it may be more fruitful to improve a common path segment than to address multiple unrelated paths.

The graph presents a "big picture" view of the entire design data set up-front. As compared to the current approach, this prevents users from having to scan through reams of detailed data and struggle to manually piece it all together in their heads. The present disclosure may help the user to focus on the real global picture of the timing, facilitate and cultivate the thinking process from a high-level view.

In some embodiments, the abstract graph representation is a two-dimensional one, which directly matches the problem data set. The representation may also build important characteristics and relationships across individual timing paths by identifying common segments. A common segment is a subset of a path that is shared by multiple paths. Each of these segments may be compactly depicted with a rectangle in the graph where the shape, size, color, and other properties are designed based on the individual score assigned to each segment.

By way of a non-limiting example, the height of a rectangle may visually depict how common that segment is across the paths in the associated timing dataset. For example, a rectangle representing a segment that is common to 1000 paths may be twice as tall as a rectangle representing a segment that is common to only 500 paths. Similarly, the length of a rectangle corresponds to the path delay associated with that segment. For example, a rectangle representing a 300 ns path segment may be six times as long as a rectangle representing a 50 ns path segment. Different colors may be used to highlight rectangles that represent segments in the top n critical paths of the timing graph, where n is a user-specifiable number, for example, 5 or 10.

Accordingly, important data may be filtered and presented in a way, which draws the user's attention to potential "hot spots." The "hot spots" are the path segments causing a delay to or adversely affecting a plurality of paths because the section is common among the plurality of paths. By way of a non-limiting example, in some embodiments, a "hot spot" is a segment of a path having higher timing-criticality above a predetermined threshold value. The timing-criticality is discussed below.

In some embodiments, when timing analysis is performed on a DUT, various paths within the design may be computed and ranked according to the time needed for the correct functionality of the logic. On a field programmable gate array (FPGA) based emulation platform, a typical design path may look very different depending on how the logic on that path is partitioned across different FPGA chips. A timing graph of the whole design may be built by using FPGA entry and exit points as anchors. In some embodiments, entry point corresponds to a point of ingress corresponding to a signal path. In some embodiments, an exit point corresponds to a point of egress corresponding to a signal path. The information from different design paths may be analyzed to understand criticality and commonality among them. A segment of a path may be considered to have higher timing-criticality if it amounts to a higher delay. If a path segment is common across multiple design paths, a higher commonality score may be assigned to it. Both criticality and commonality are key aspects to help create a global timing graph.

Path segment commonality across the entire design may take a huge amount of time (especially for larger designs). Accordingly, by way of a non-limiting example, in some embodiments, the design timing graph may be sorted by overall timing criticality and then the m most critical paths may be saved to a database for commonality computation, where m may be a small subset of the overall number of paths, for example 1000. The timing graph may, therefore, represent an important subset of the full timing graph for the user to focus his/her attention.

FIG. 1 illustrates criticality and commonality computation for timing paths, according to an embodiment of the present disclosure. As shown in FIG. 1, three different timings paths, path 1 102a, path 2 102b, and path 3 102c, are shown moving through different FPGAs F1-F6 104a-104f. A delay corresponding to each path segment is also shown in FIG. 1. Since the 200 ns segment 106 is common between path 1 102a and path 2 102b, it gets a commonality score of 2. The delay value of this segment 106 that is 200 ns becomes the criticality score for this segment 106. Similarly, 250 ns segment 108 is common among all three paths 102a, 102b, and 102c; it gets a commonality score of 3. While 100 ns segment 110 that is only applicable for path 3 102c, the commonality score of this segment 110 is 1. Similarly, the criticality scores for the segments 108 and 110 are 250 ns and 100 ns, respectively.

Figure 2:
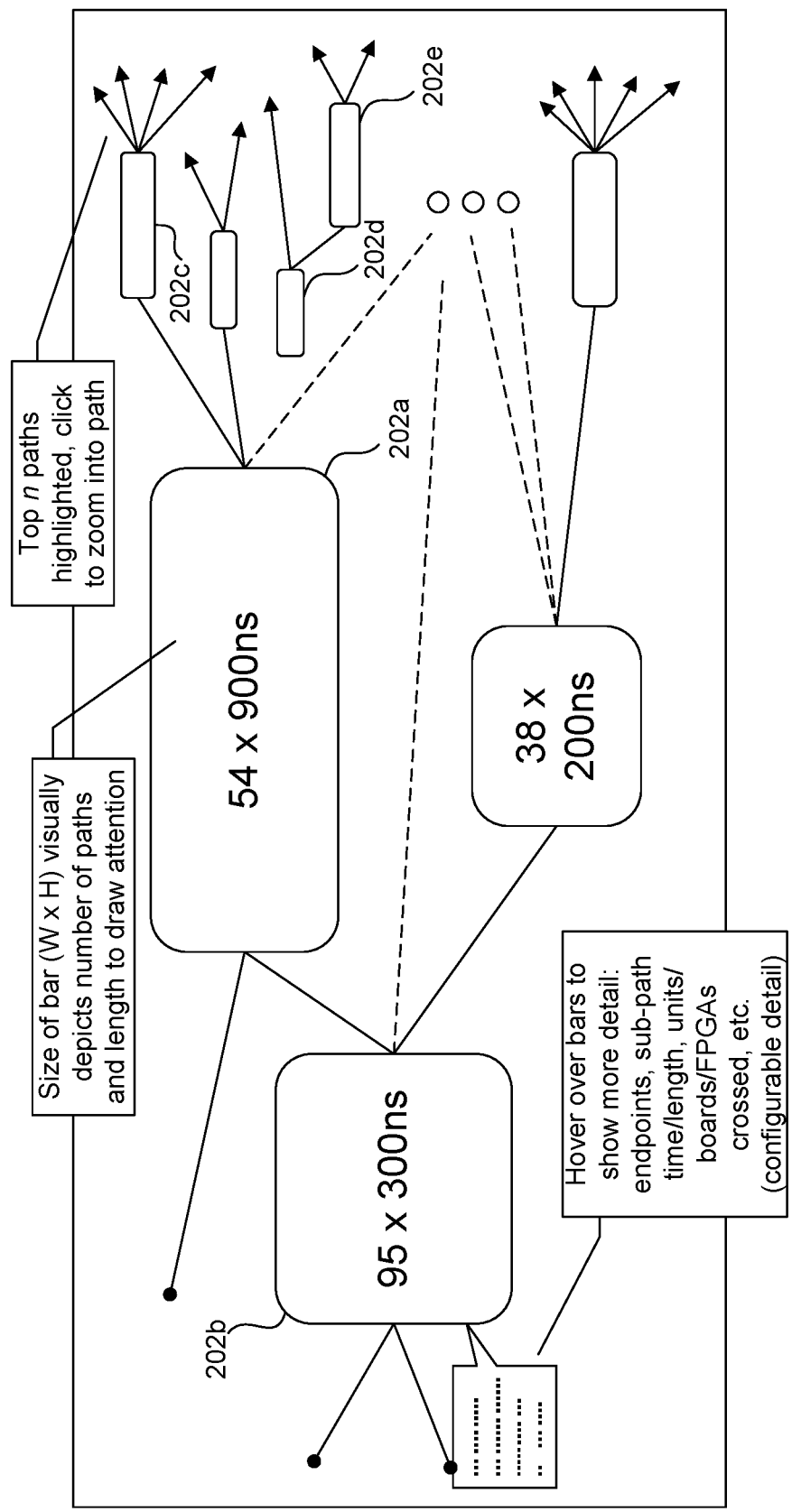
FIG. 2 illustrates a timing graph representation for the entire design, according to an embodiment of the present disclosure.

FIG. 2 illustrates a timing graph representation for the entire design, according to an embodiment of the present disclosure. Once all timing paths have been distributed into small delay segments with individual criticality and commonality score, the entire design may be represented as a timing graph.

Each node in the graph represents a timing path segment. A segment is a portion of a path that traverses multiple FPGAs devices/boards. Multiple segments in series form a full timing path. Each rounded rectangular box 202a, 202b, 202c, 202d, and 202e in FIG. 2 may represent a timing segment. Accordingly, each segment may be represented via graph representation that allows a compact, high-level depiction of each segment. The length of different boxes may correspond to their timing-criticality score. The longer box allows users to identify the biggest contributors easily and zoom into them for further analysis.

A shared path segment may only be represented once in the graph. This representation allows users to see the commonality of a segment across the entire graph. A commonality score may be used to determine the height of the node in the graph. A taller rectangle box represents a segment, which is common across multiple paths. For example, in FIG. 2, the box 54×900 ns 202a shows a path segment, which is common in 54 paths. This graph representation compactly depicts relevant information that is otherwise spread over multiple pages in the current individual timing path presentation.

Segments, represented by boxes, are interconnected via arcs in the graph, represented by lines. This depicts relationships between the different paths. Various visual aids may also be provided in a graph to draw users' attention to key characteristics. For example, red color may be used to denote a critical path. An auxiliary database may be created to emphasize key characteristics. This database may be linked with the timing graph such that when a timing segment is selected, the user may view, inspect, and analyze all important information about the selected timing segment.

By way of a non-limiting example, as shown in FIG. 2, there may be two large boxes labeled "54×900 ns" 202a and "95×300 ns" 202b. Shape/size and color of various boxes may be used to draw the user's attention to investigate further such that the user may not be required to review and/or analyze low-level details of individual paths. The representation of the timing paths based on the commonality and relationships between the various segments of the entire DUT as shown in FIG. 2 may help to identify the "hot spots" quickly and improve the performance of the DUT.

In some embodiments, by way of a non-limiting example, the representation of the DUT as shown in FIG. 2 may be an initial view, depicting the full data set at a high level. Once a segment is selected for further analysis, the user can zoom into it for more detailed information or low-level information which can be provided through user configurable auxiliary views. By not showing everything upfront, this graph representation allows users to focus on timing aspects that have a global impact and have a high value, for example, endpoints of a path, time per length for a plurality of sub-paths of the path, a total number of units, boards, and/or FPGAs crossed, etc. The user may select total of top n paths to be included in the graphical representation. In some embodiments, the graphical representation may correspond to any geometric shape (e.g, a rectangle, an oval, etc.). A first dimension (e.g., height or width) of the geometric shape may be based on the commonality score and a second dimension (e.g., the other of the height or width) may be based on the criticality score. For example, the height and width of the graphical representation may be different for different commonality scores and different criticality scores. In the same or alternative embodiments, one of the height or width of the graphical representation may be based on either the commonality score or the criticality score and another characteristic (e.g., color) of the graphical representation may be based on the other of the criticality score or the commonality score.

In accordance with some embodiments, by way of a non-limiting example, the low-level information may include connections between various units, modules, and/or field-programmable gate arrays (FPGAs) that may be processed and provided to the user in graphical format. The low-level information may be abstracted, allowing a user to drill down for detail. Further, internal emulator representation may be translated or mapped to original design names so that the user may correlate the graphical visualization with the original design. Accordingly, the user may be enabled to identify bottlenecks in the original design quickly. Thereby, performance of the emulator may be maximized.

Effective visualization of emulation timing paths is a difficult and tedious effort for the user trying to analyze and improve emulation performance. The present disclosure describes a database and two separate but correlated detail views of graphical visualization in which the user may zoom into "next-level down" view after considering details depicted by a global timing view, which provides timing delay information for various segment paths. The two next-level down views described here may be (1) an emulator hardware view that may depict timing paths across the various emulator hardware components; and (2) a design view that may depict timing paths across different parts of the design compiled into the emulator. Each view may make it considerably easier for the user to directly and compactly visualize critical paths in the context of both the emulator and the design, and enabling the user to rapidly identify bottlenecks, and subsequently, improve performance. Without these views, the user may be forced to manually search through a deluge of low-level detailed timing information in textual form, filter out irrelevant information, and painstakingly build a mental image that depicts the bottleneck, which is tedious, effort/time-intensive work, and prone to human error. With the new graphical visualization views as described in the present disclosure according to various embodiments, the relevant information is automatically gathered, filtered and graphically depicted on a screen, leaving the user to focus primarily on interpreting the result and identifying the bottleneck.

In accordance with some embodiments, all user actions may be tracked by storing and updating information in a database. In any complex analysis, it is very common to go back and forth and review previous work. By keeping track of all user activities and by being able to display any of the previous steps, it facilitates quick resolution, which is an improvement over existing solutions, which keep only the most recent view for the user.

In accordance with some embodiments, the hardware view and the design view may be built with detailed relevant information. By way of a non-limiting example, the hardware view may provide both structural and timing information based on emulator architecture that may include, for example, a unit, a board, and field-programmable-gate-array (FPGA) boundaries, etc. In addition, there may be a tight correlation between the hardware view and the design view that may enable the user to comprehend a bottleneck in both contexts effectively.

In accordance with some embodiments, the entry point of the user performance analysis flow may be a global-timing view, which may depict all critical paths together as path delay segments grouped together using time-criticality that represents delay and commonality scores that represents a specific path being common among many other design paths. Additional information associated with each segment may be stored into an auxiliary database. When user selects a segment, information associated with the selected segment may guide the user to make a right choice for further detailed analysis.

In accordance with some embodiments, during timing analysis, various paths within the design may be computed and ranked according to the time needed for the correct functionality of a logic. On FPGA based emulation platforms, a typical design path may look very different depending on how the logic on that path may have been partitioned and routed across different hardware components in the system. Accordingly, a connectivity graph for any timing segment may be the first embodiment as described herein. By way of a non-limiting example, an architecture of an emulator may be modular. Multiple FPGA chips may be connected on a PCB (printed circuit board), which may be "module". Multiple modules may be connected through a backplane to form a "unit". Multiple units may be connected through external cables to form an emulation system. This type of hardware distribution may be represented in hardware based hierarchy like U*_M*_F*. A logic path inside a design may also be represented completely in terms of hardware hierarchy. For example, a path may go from U1_M2_F5 to U2_M1_F3 to U2_M1_F7 to U2_M2_F2 and so on. This information may be critical in performance analysis because if the logic can be grouped close together, the path traversal may be shorter, and performance may be higher. Small chunks of design may be mapped inside each FPGA chip during a compile process. By way of a non-limiting example. it may be established that a design hierarchy top.sub.signal may be mapped inside, for example, U1.M2.F5. All this information may be stored in the auxiliary database. By way of a non-limiting example, in some embodiments, the architecture of the emulator may not have a direct connection between two FPGA chips. In such cases, a "feedthrough" connection may be made through alternate FPGAs. Such partitioning and routing considerations may be captured in the auxiliary database.

In accordance with some embodiments, the auxiliary database may present various path choices to the user when either a start or end point in the graph is selected. This prevents the user from selecting two points that are not connected to each other. When the user selects a timing path or segment of a timing path, the user may be presented with two choices: (1) use the hardware view to understand an impact of how the path is partitioned and routed across different components of the emulator hardware, or (2) use the design view to understand how the timing path maps to different parts of the design. Both views are correlated and coupled so that the user can switch between them.

In accordance with some embodiments, the hardware view may be built using FPGA I/O ports as anchor points. The auxiliary database may be queried for information such as hardware hierarchy, design mapping inside hardware hierarchy, names of FPGA ports, timing delay associated with different segments, etc. Finally, the hardware view may be created with proper symbols and connections. In order to present all timing information, the delay time of each wire or logic may be annotated on the same graph. The user may directly see the timing path on the screen instead of having to build a mental image from a large amount of low-level timing data.

Figure 3:
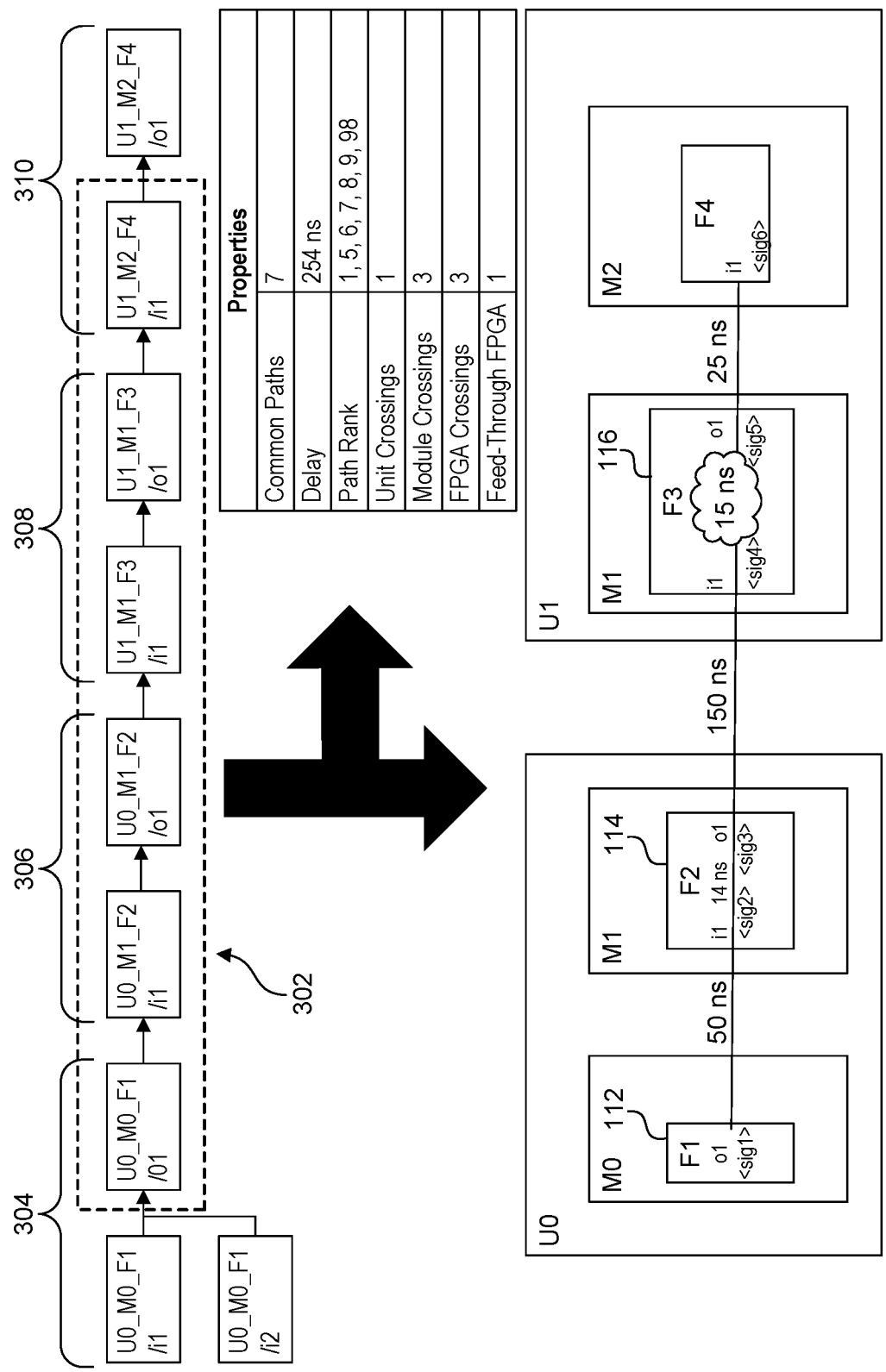
FIG. 3 illustrates a hardware view of a selected segment of a timing path, in accordance with some embodiments.

FIG. 3 illustrates a hardware view of a selected segment of a timing path, in accordance with some embodiments. FIG. 3 describes how a hierarchical structure and connection may be generated. As shown in FIG. 3, a selected segment 302 in the path may, for example, include four FPGAs that are U0_M0_F1 304, U0_M1_F2 306, U1_M1_F3 308, and U1_M2_F4 310. By way of a non-limiting example, the " " in each FPGA name may be used as a delimiter to define hardware hierarchy. A different notation may be used to show different types of FPGAs: Start and end points, e.g., U0_M0_F1 312, feedthrough FPGAs, e.g., U0_M1_F2 314, and FPGAs that have logic inside them, e.g., U1_M1_F3 316. A drawing engine may extract timing delay information for each segment and annotate in the same view. In addition, design mapping info may be displayed though annotation of register-transfer-level (RTL) hierarchy path. This view may be fully interactive and may allow the user to review RTL source code by clicking the RTL name, e.g., <sig1>, <sig2>, etc. All important information about an FPGA, a module, or a unit crossing may be captured and displayed, which may allow the user to quickly identify path segments with the highest returns. In addition, the individual timing path representation may not explicitly show relationships between paths. These relationships are important to comprehend in order to address the problem holistically. For example, as discussed above, it is typical that multiple timing paths may share common segments, and it may be more fruitful to improve a common path segment than to address multiple unrelated paths.

In accordance with some embodiments, hardware hierarchy visualization may allow the user to expand or collapse any part of the hardware view and thereby may allow the user to focus on a specific area in cases where the graphical view contains lot of data. The user may also interactively zoom-in on a selected portion of the view. For example, when the selected portion is a portion of the hardware view, the user may interactively zoom-in along the hardware hierarchy of the DUT across the timing path. The user may also create, modify, update, and/or delete one or more Graphical User Interface (GUI) annotations for the view using an interactive interface. The GUI annotation may be used to highlight detail of importance to the user, for example, a problem area across the view. By way of a non-limiting example, the user may also analyze the timing path with a field-programmable gate array (FPGA) using FPGA port as an anchor point to build path traversal in a hardware view. By way of a non-limiting example, when the user expands or collapses any part of the hardware view, other portions of the hardware view may be minimized.

Figure 4:
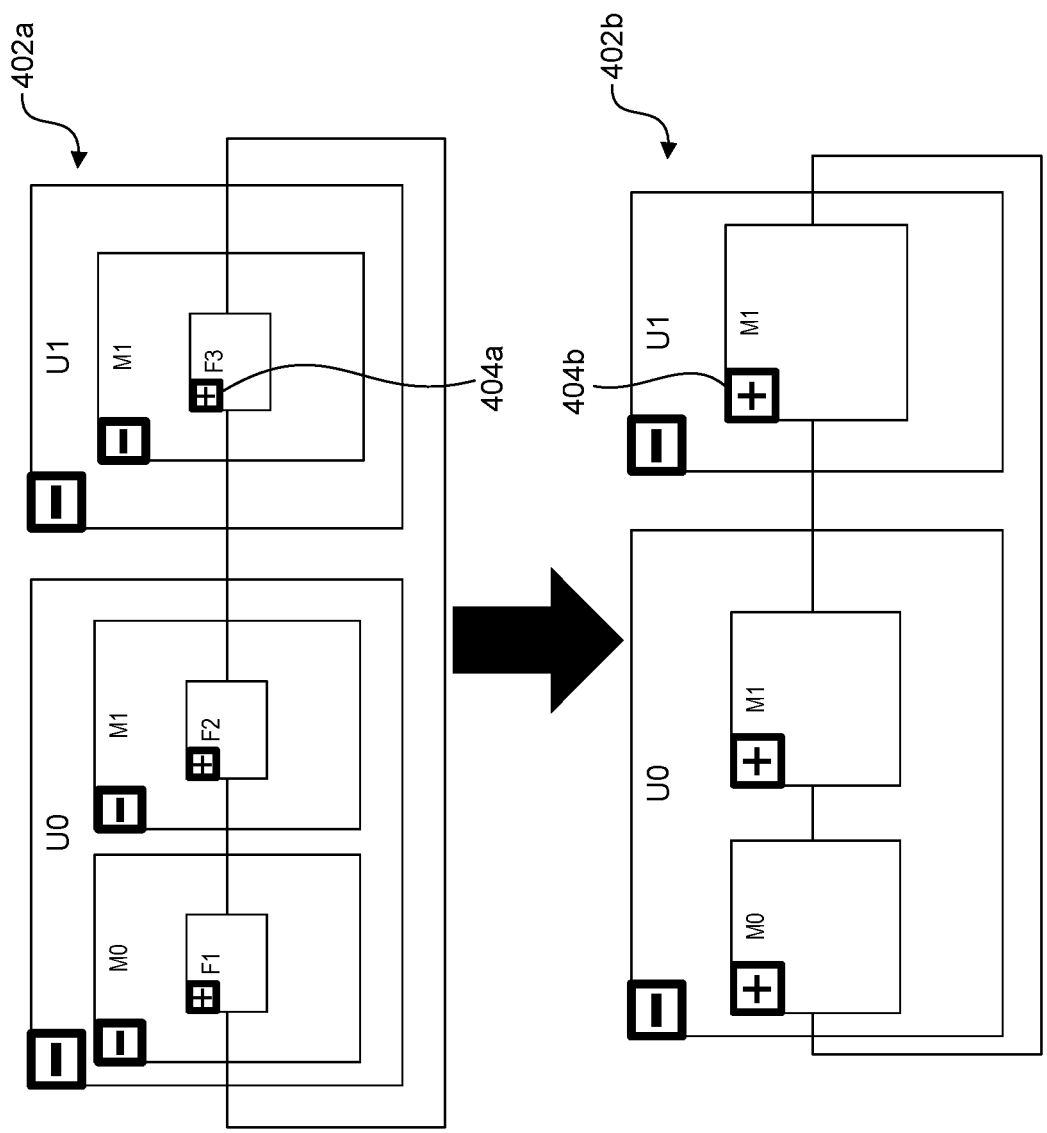
FIG. 4 illustrates a collapsible hardware view through hardware hierarchy, in accordance with some embodiments.

FIG. 4 illustrates a collapsible hardware view through hardware hierarchy, in accordance with some embodiments. As shown in FIG. 4, an FPGA U1_M1_F3 402*a* indicates the FPGA is part of a unit U1 and a module M1. However, the FPGA U1_M1_F3, as shown by 402*b* has the FPGA collapsed in the module M1. The user may need to click on the + sign shown as 404*b* to expand. Similarly, the FPGA U1_M1_F3 402 shows all levels of hierarchy for the FPGA, it can not be expanded further, and it is shown using a minus sign as shown by 404*a*.

Figure 5:
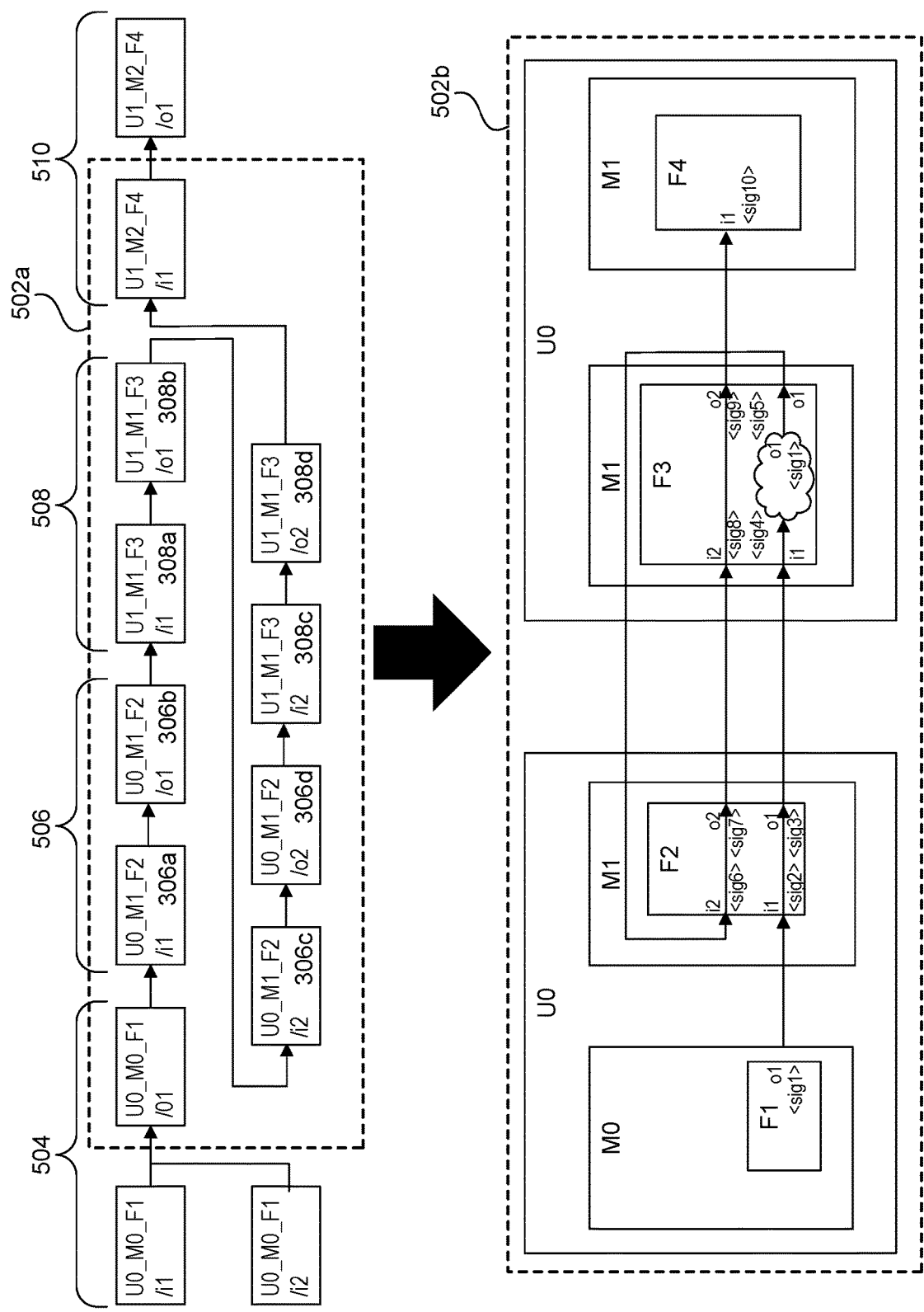
FIG. 5 illustrates an example of hardware mapping, in accordance with some embodiments.

FIG. 5 illustrates an example of hardware mapping, in accordance with some embodiments. As shown in FIG. 5, a selected path 502 may include four FPGAs U0_M0_F1 504, U0_M1_F2 506, U1_M1_F3 508, and U1_M2_F4 510. Further, as shown in FIG. 5, the FPGA U0_M1_F2 506 may have more than one input and/or output port, as shown by 506*a*, 506*b*, 506*c*, and 506*d*. Similarly, the FPGA U1_M1_F3 508 may also have more than one input and/or output port, as shown by 508*a*, 508*b*, 508*c*, and 508*d*. Accordingly, the selected path 502 based on the connections between the FPGA of the selected path may be represented as shown by 502*b* that shows hardware mapping based on the graphical representation shown by 502. Accordingly, when a path traverses through the same FPGA multiple times, a rendering engine may add additional entry and exit points on the same FPGA as shown in FIG. 5 by 502. This sort of representation may allow the tool to clearly identify and highlight the cases where partitioning or routing may not be efficient because of multiple hops.

As described above, another dimension of performance exploration is the design view, which may be presented through detailed path information either in table form or in schematic form. By way of a non-limiting example, the table format is constructed such that the start point of the path is at the top, and every new line may show the next RTL consumer.

FIG. 6 illustrates a design view of a selected segment of a path, in accordance with some embodiments. Signal names, as shown by a column 602 may be introduced by the compiler to synthesize a very high-level language construct, or to support additional instrumentation requested by the user. Such nets may not have corresponding RTL names. The auxiliary database may capture all of this information and graphical methods may be used to differentiate RTL and non-RTL Names. By way of a non-limiting example, as shown in FIG. 6, non RTL-names may be written in grey color and may also have < and > around the name as shown by 604. All RTL names may be clickable and, when clicked, may take the user to the corresponding source code. Other information in the design view may include, for example, FPGA name or identification, arrival time, delay time, mux ratio, FPGA port name, and/or netlist name, etc.

In accordance with some embodiments, the tabular path view may be collapsible 606*b* or expandable 606*a* and/or 606*c* to allow the user to zoom into the area of interest. The RTL name entries may be aligned with an emulator hardware component hierarchy, as shown in the hardware view. This allows a close correlation between the design view and the hardware view. To strengthen the correlation further, different aspects of the hardware view may be integrated in table format via additional columns and in schematic format via graphical user interface (GUI) annotations. By way of a non-limiting example, the user may have the ability to turn on/off any information and manage visible information.

Figure 7:
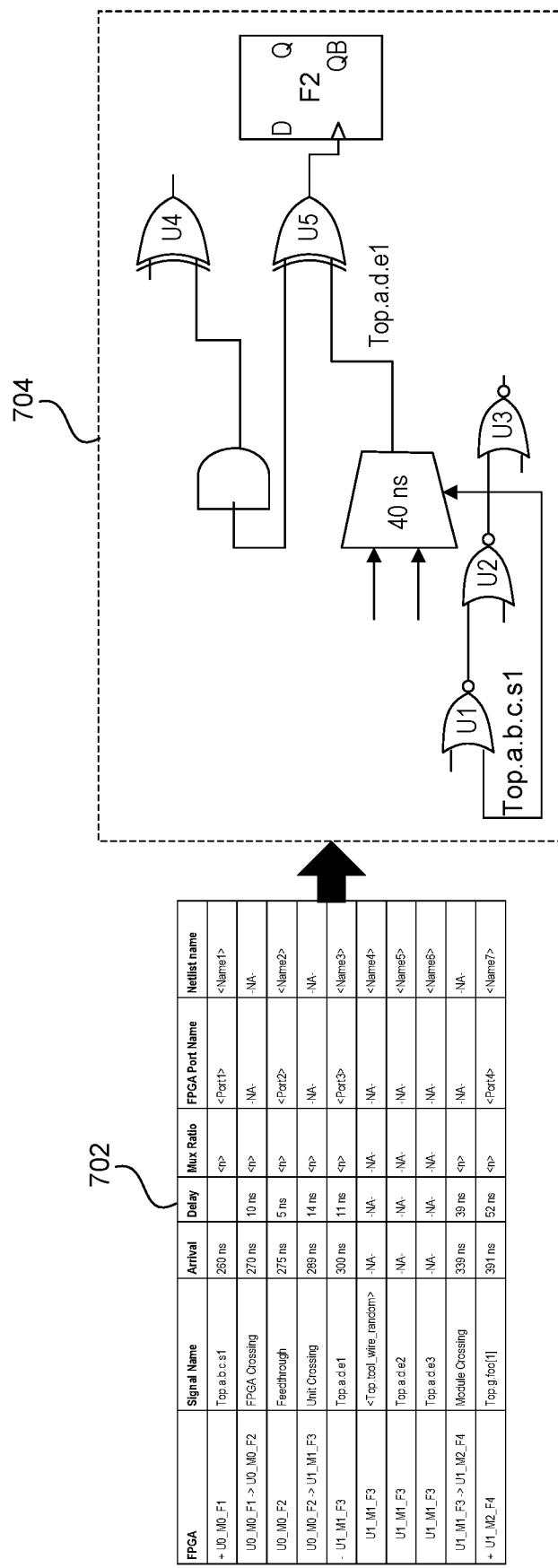
FIG. 7 illustrates a tabular path view and schematic path view of design components, in accordance with some embodiments.

FIG. 7 illustrates tabular path view and schematic path view of design components, in accordance with some embodiments. The tabular path view may present a very focused summary of RTL path. But, in some cases, this may not be enough, and the use may desire to explore surrounding logic. To facilitate this, a schematic path view may be generated. The schematic path view may be fully integrated and available for any other view. For example, the user may right click any RTL signal name in FIG. 7 in tabular path view 702 to request a schematic path view around it. The generated schematic path view, for example, may be as shown in FIG. 7 by 704.

Figure 8:
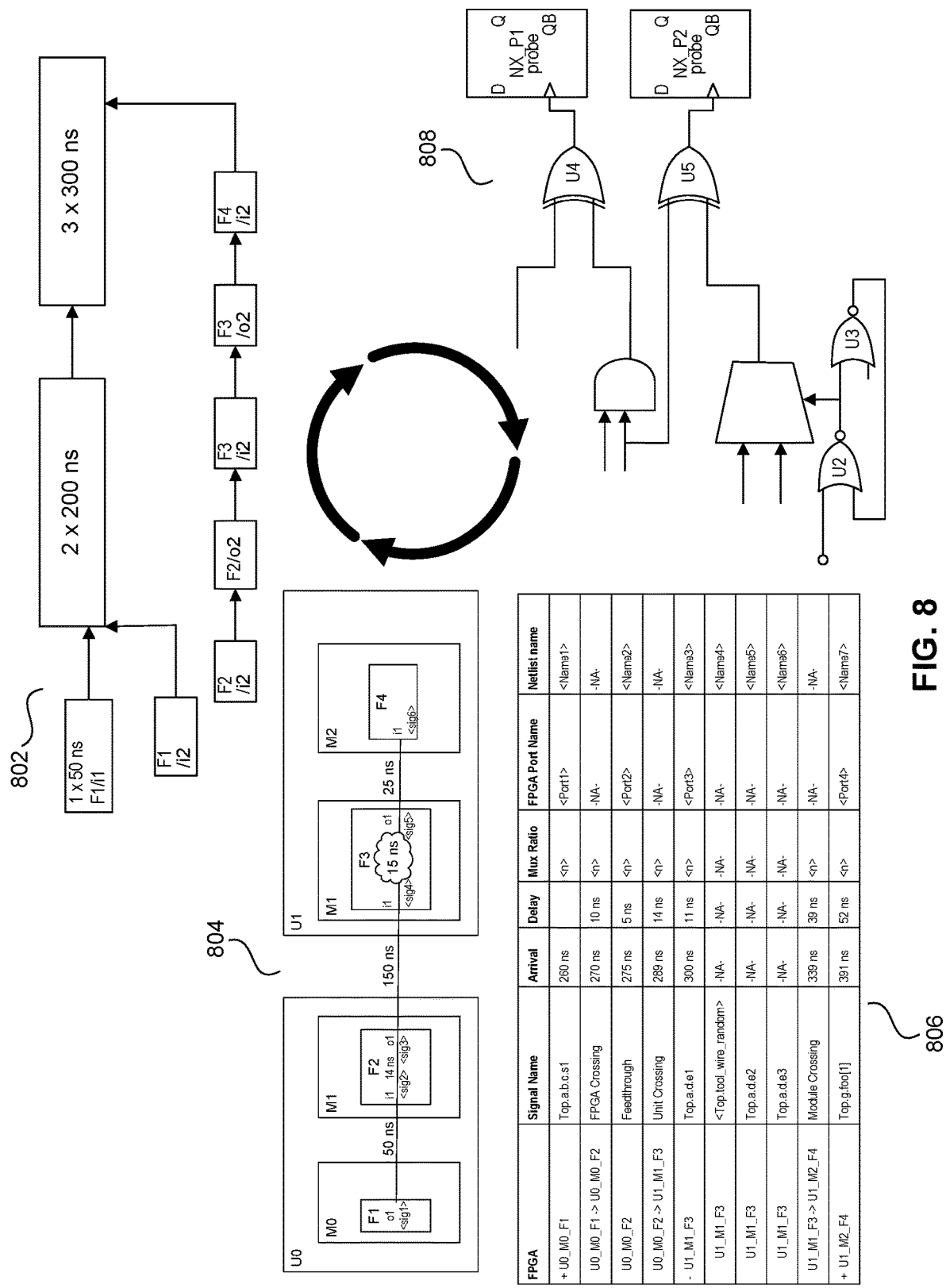
FIG. 8 illustrates associated windows for a specific path or a segment of a path, in accordance with some embodiments.

FIG. 8 illustrates associated windows for a specific path or a segment of a path, in accordance with some embodiments. As the user interacts with the tool, more than one view may be opened by the user from different parts of the design. In such cases, to maintain associativity across different views, an activity database may capture and store entries corresponding to user actions, open windows, annotations, properties, etc. By way of a non-limiting example, one user action may have four different views, such as a global timing view 802, the hardware view 804, the tabular path view 806, and the schematic path view 808. Each view may represent a different aspect of a plurality of aspects of the DUT. By way of a non-limiting example, the plurality of aspects may include global timing information, timing path information in a design context, timing path information in a hardware context, and source code information. When the user selects any of these windows, other associative windows may be automatically highlighted. Global timing view represents timing path information between various units, modules, and/or FPGAs, etc. Accordingly, the global timing view is a high level, a timing graph view of the entire design comprising all timing critical paths.

Figure 9:
FIG. 9 illustrates history of interactive user explorations, in accordance with some embodiments.

FIG. 9 illustrates history of interactive user explorations, in accordance with some embodiments. During user interactions, the user may want to revisit a previous step. By way of a non-limiting example, this may be facilitated via an action history capture and replay. As shown in FIG. 9 by

902, each path segment accessed by the user may be captured along with some pertinent information for cross reference. Through this interface, the user may access to any of the views and return to a previous step also.

Figure 10:
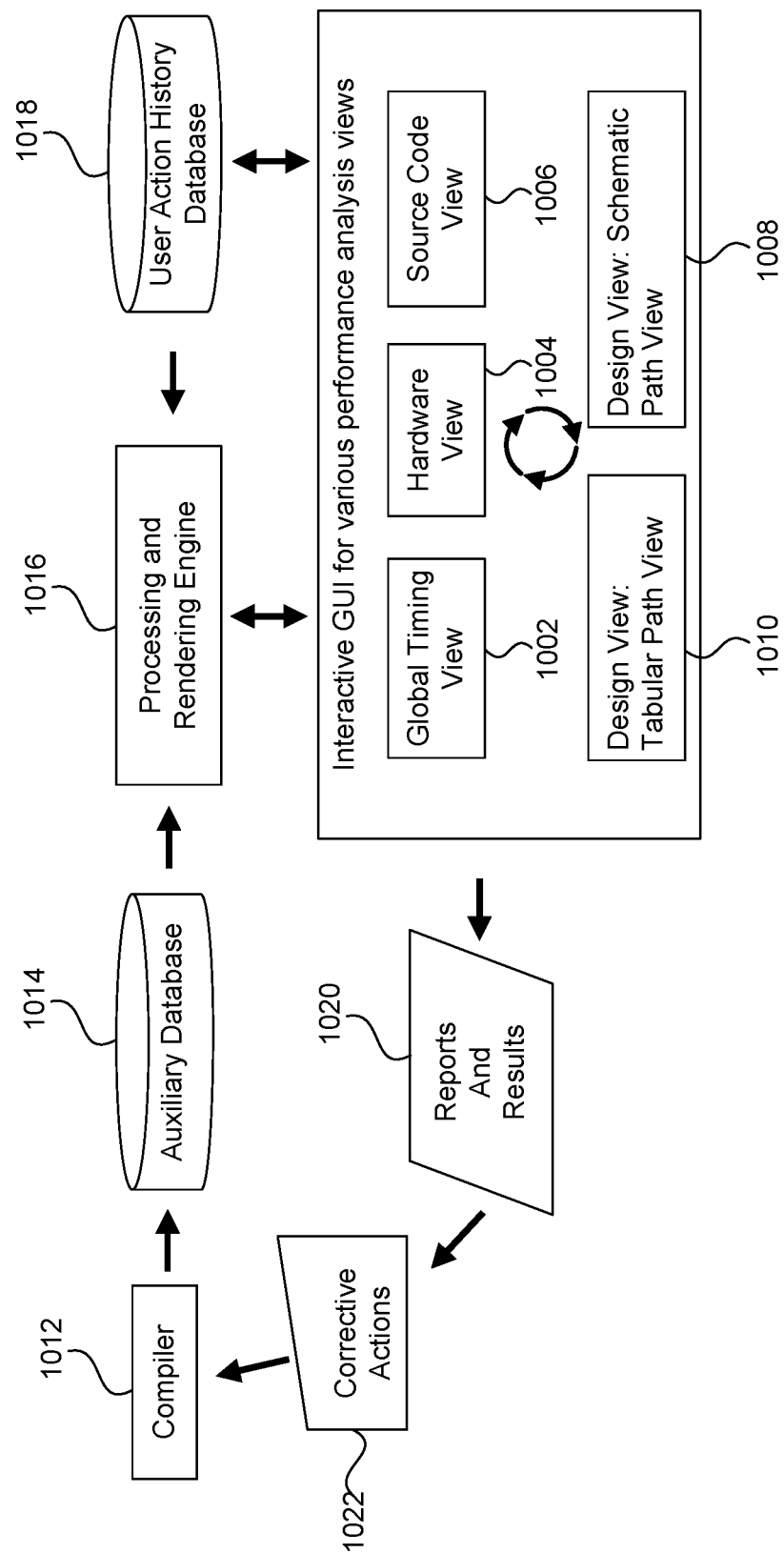
FIG. 10 illustrates a flow-diagram of a method to enable interlinked views of emulation timing paths across emulator hardware and design hierarchies, in accordance with some embodiments.

FIG. 10 illustrates a flow-diagram of a method to enable multiple interlinked views of emulation timing paths across emulator hardware and design hierarchies, in accordance with some embodiments. Various embodiments described herein may provide a workflow where the user may start from a very high-level global timing view and slowly zooms in to the area of interest through an interactive GUI to get detail information either in terms of hardware or in terms of design. As described herein, the hardware view may highlight key hotspots leading to low performance. The highlighted key hotspots may be in terms of unit, module, FPGA boundary crossings, significant back and forth routing, and/or system delays associated with routing, etc. As described in the present disclosure, the design view may show which RTL logic contributes to low performance and provide the user with various hooks to analyze in detail.

As shown in FIG. 10, various views that may be displayed on the interactive GUI may be a global timing view 1002, hardware view 1004, source code view 1006, design view in schematic path view 1008, and design view in tabular path view 1010. The source code view 1006 may display source code and/or HDL code corresponding to a selected segment of the DUT hierarchy. The global timing view may be linked to the hardware view, the source code view, and/or the schematic path view and vice versa. Similarly, the hardware view may be linked to the source code view and/or the schematic path view and vice versa. The linked views allow the user to switch to the other views. Accordingly, the views are synchronized with each other, and selecting one view of the plurality of view may automatically perform a contextual selection of corresponding information from another view.

A device under test (DUT) may be processed by an emulation compiler 1012, and during the process of timing closure, the emulation compiler 1012 may create an auxiliary database 1014 in a machine readable format, for example, structured query language (SQL). The auxiliary database 1014 may contain timing paths' information, hardware partitioning information, and/or timing delay information, etc. A processing and rendering engine 1016 may consume this information to produce different views in GUI according to various embodiments described herein. By way of a non-limiting example, all of these views may be interactive, and the processing and rendering engine 1016 may be designed to read any user actions and take appropriate actions accordingly. All of the user actions may be recorded into user action history database 1018, which may be used to either link to already open GUI view or send a command to the processing and rendering engine 1016 to redraw the same view. When the user finds any useful information through tool interactions, results may be extracted in various reports, shown in FIG. 10 by 1020, for records and further analysis. This may help in identifying corrective actions, shown in FIG. 10 by 1022, leading to either RTL, tool or setup improvements, which in turn may result in higher performance. This process may be repeated multiple times until the desired results are achieved.

Figure 11:
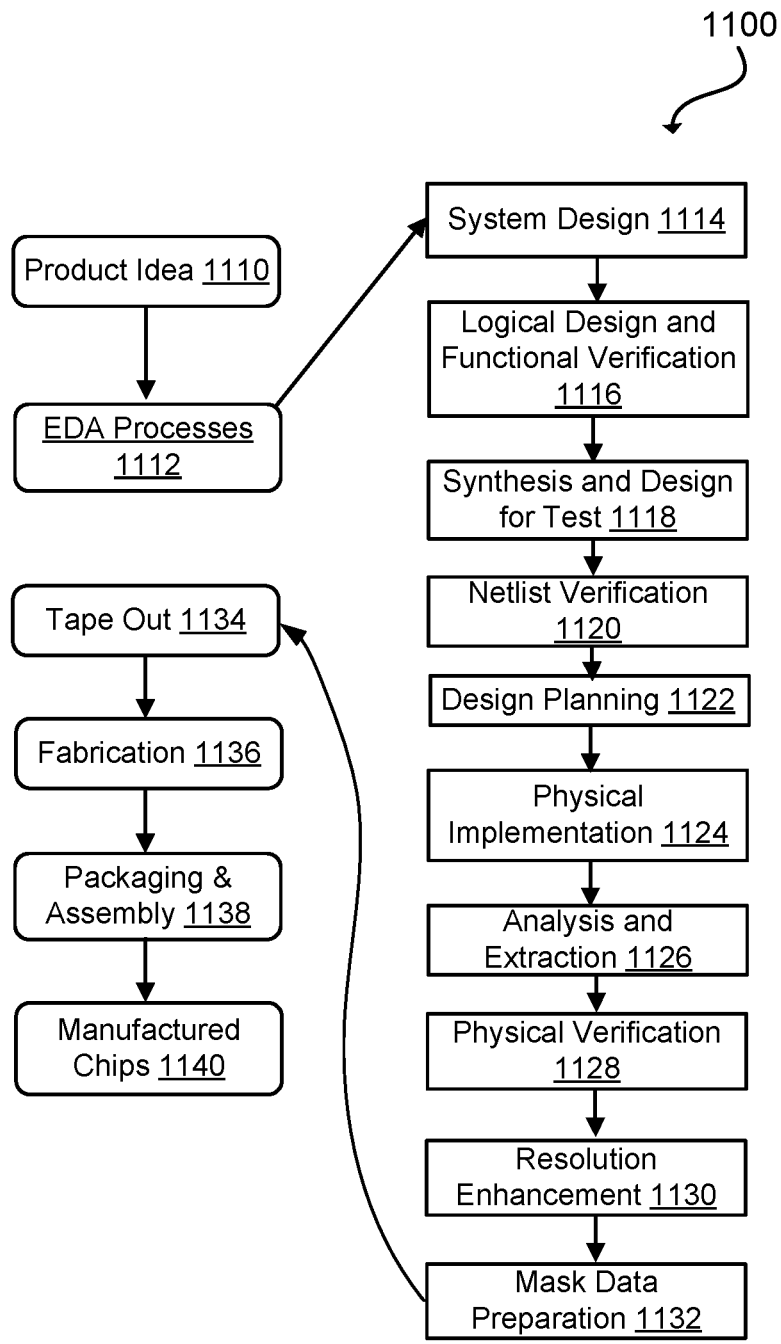
FIG. 11 illustrates a flowchart of various processes used during the design and manufacture of an integrated circuit, in accordance with some embodiments.

FIG. 11 illustrates an example set of processes 1100 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 1110 with information supplied by a designer, information that is transformed to create an article of manufacture that uses a set of EDA processes 1112. When the design is finalized, the design is taped-out 1134, which is when artwork (e.g., geometric patterns) for the integrated circuit is sent to a fabrication facility to manufacture the mask set, which is then used to manufacture the integrated circuit. After tape-out, a semiconductor die is fabricated 1136, and packaging and assembly processes 1138 are performed to produce the finished integrated circuit 1140.

Specifications for a circuit or electronic structure may range from low-level transistor material layouts to high-level description languages. A high-level of abstraction may be used to design circuits and systems, using a hardware description language ('EIDL') such as VHDL, Verilog, SystemVerilog, SystemC, MyHDL or OpenVera. The HDL description can be transformed to a logic-level register transfer level ('RTL') description, a gate-level description, a layout-level description, or a mask-level description. Each lower abstraction level that is a less abstract description adds more useful detail into the design description, for example, more details for the modules that include the description. The lower levels of abstraction that are less abstract descriptions can be generated by a computer, derived from a design library, or created by another design automation process. An example of a specification language at a lower level of abstraction language for specifying more detailed descriptions is SPICE, which is used for detailed descriptions of circuits with many analog components. Descriptions at each level of abstraction are enabled for use by the corresponding tools of that layer (e.g., a formal verification tool). A design process may use a sequence depicted in FIG. 12. The processes are described by being enabled by EDA products (or tools).

During system design 1114, the functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During the logic design and functional verification 1116, modules or components in the circuit are specified in one or more description languages, and the specification is checked for functional accuracy. For example, the components of the circuit may be verified to generate outputs that match the requirements of the specification of the circuit or system being designed. Functional verification may use simulators and other programs such as test bench generators, static HDL checkers, and formal verifiers. In some embodiments, special systems of components referred to as 'emulators' or 'prototyping systems' are used to speed up the functional verification.

During synthesis and design for test 1118, HDL code is transformed into a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 1120, the netlist is checked for compliance with timing constraints and for correspondence with the HDL code. During design planning 1122, an overall floor plan for the integrated circuit is constructed and analyzed for timing and top-level routing.

During layout or physical implementation 1124, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 1126, the circuit function is verified at the layout level, which permits refinement of the layout design. During physical verification 1128, the layout design is checked to ensure that manufacturing constraints are correct, such as DRC constraints, electrical constraints, lithographic constraints, and that circuitry function matches the HDL design specification. During resolution enhancement 1130, the geometry of the layout is transformed to improve how the circuit design is manufactured.

During tape-out, data is created to be used (after lithographic enhancements are applied if appropriate) for the production of lithography masks. During mask data preparation 1132, the 'tape-out' data is used to produce lithography masks that are used to produce finished integrated circuits.

A storage subsystem of a computer system (such as computer system 1300 of FIG. 13, or host system 1207 of FIG. 12) may be used to store the programs and data structures that are used by some or all of the EDA products described herein, and products used for the development of cells for the library and for the physical and logical design that use the library.

Figure 12:
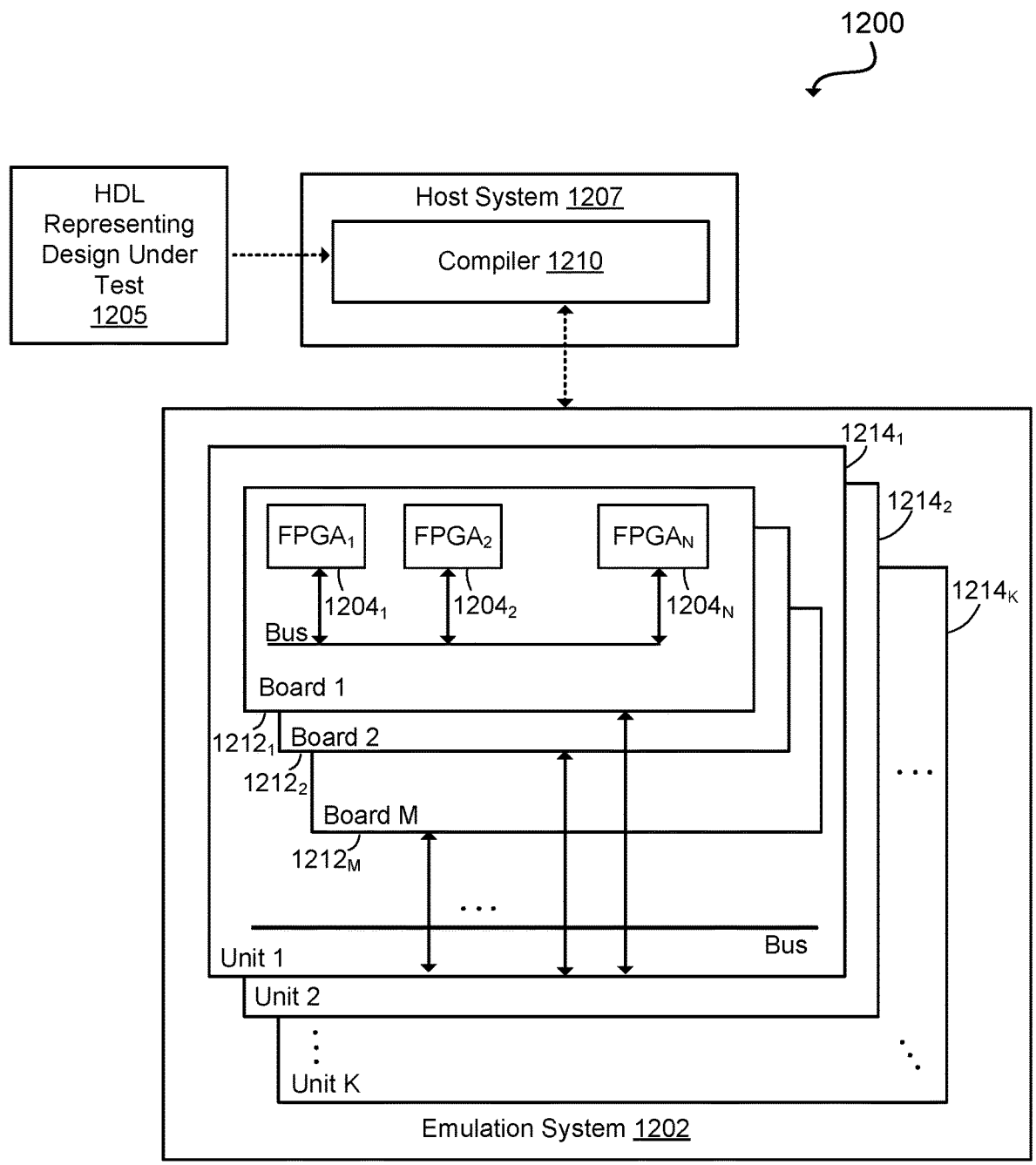
FIG. 12 illustrates a diagram of an example emulation system in accordance with some embodiments.

FIG. 12 depicts a diagram of an example emulation environment 1200. An emulation environment 1200 may be configured to verify the functionality of the circuit design. The emulation environment 1200 may include a host system 1207 (e.g., a computer that is part of an EDA system) and an emulation system 1202 (e.g., a set of programmable devices such as Field Programmable Gate Arrays (FPGAs) or processors). The host system generates data and information by using a compiler 1210 to structure the emulation system to emulate a circuit design. Circuit design to be emulated is also referred to as a Design Under Test ('DUT') where data and information from the emulation are used to verify the functionality of the DUT.

The host system 1207 may include one or more processors. In the embodiment where the host system includes multiple processors, the functions described herein as being performed by the host system can be distributed among the multiple processors. The host system 1207 may include a compiler 1210 to transform specifications written in a description language that represents a DUT and to produce data (e.g., binary data) and information that is used to structure the emulation system 1202 to emulate the DUT. The compiler 1210 can transform, change, restructure, add new functions to, and/or control the timing of the DUT.

The host system 1207 and emulation system 1202 exchange data and information using signals carried by an emulation connection. The connection can be but is not limited to, one or more electrical cables such as cables with pin structures compatible with the Recommended Standard 232 (RS232) or universal serial bus (USB) protocols. The connection can be a wired communication medium or network such as a local area network or a wide area network such as the Internet. The connection can be a wireless communication medium or a network with one or more points of access using a wireless protocol such as BLUETOOTH or IEEE 802.11. The host system 1207 and emulation system 1202 can exchange data and information through a third device such as a network server.

The emulation system 1202 includes multiple FPGAs (or other modules) such as FPGAs 1204$_1$ and 1204$_2$, as well as additional FPGAs to 1204$_N$. Each FPGA can include one or more FPGA interfaces through which the FPGA is connected to other FPGAs (and potentially other emulation components) for the FPGAs to exchange signals. An FPGA interface can be referred to as an input/output pin or an FPGA pad. While an emulator may include FPGAs, embodiments of emulators can include other types of logic blocks instead of, or along with, the FPGAs for emulating DUTs. For example, the emulation system 1202 can include custom FPGAs, specialized ASICs for emulation or prototyping, memories, and input/output devices.

A programmable device can include an array of programmable logic blocks and a hierarchy of interconnections that can enable the programmable logic blocks to be interconnected according to the descriptions in the HDL code. Each of the programmable logic blocks can enable complex combinational functions or enable logic gates such as AND, and XOR logic blocks. In some embodiments, the logic blocks also can include memory elements/devices, which can be simple latches, flip-flops, or other blocks of memory. Depending on the length of the interconnections between different logic blocks, signals can arrive at input terminals of the logic blocks at different times and thus may be temporarily stored in the memory elements/devices.

FPGAs 1204$_1$-1204$_N$ may be placed onto one or more boards 1212$_1$ and 1212$_2$ as well as additional boards through 1212$m$. Multiple boards can be placed into an emulation unit 1214$_1$. The boards within an emulation unit can be connected using the backplane of the emulation unit or any other types of connections. In addition, multiple emulation units (e.g., 1214$_1$ and 1214$_2$ through 1214$_K$) can be connected to each other by cables or any other means to form a multi-emulation unit system.

For a DUT that is to be emulated, the host system 1207 transmits one or more bit files to the emulation system 1202. The bit files may specify a description of the DUT and may further specify partitions of the DUT created by the host system 1207 with trace and injection logic, mappings of the partitions to the FPGAs of the emulator, and design constraints. Using the bit files, the emulator structures the FPGAs to perform the functions of the DUT. In some embodiments, one or more FPGAs of the emulators may have the trace and injection logic built into the silicon of the FPGA. In such an embodiment, the FPGAs may not be structured by the host system to emulate trace and injection logic.

The host system 1207 receives a description of a DUT that is to be emulated. In some embodiments, the DUT description is in a description language (e.g., a register transfer language (RTL)). In some embodiments, the DUT description is in netlist level files or a mix of netlist level files and HDL files. If part of the DUT description or the entire DUT description is in an HDL, then the host system can synthesize the DUT description to create a gate-level netlist using the DUT description. A host system can use the netlist of the DUT to partition the DUT into multiple partitions, where one or more of the partitions include trace and injection logic. The trace and injection logic traces interface signals that are exchanged via the interfaces of an FPGA. Additionally, the trace and injection logic can inject traced interface signals into the logic of the FPGA. The host system maps each partition to an FPGA of the emulator. In some embodiments, the trace and injection logic is included in select partitions for a group of FPGAs. The trace and injection logic can be built into one or more of the FPGAs of an emulator. The host system can synthesize multiplexers to be mapped into the FPGAs. The multiplexers can be used by the trace and injection logic to inject interface signals into the DUT logic.

The host system creates bit files describing each partition of the DUT and the mapping of the partitions to the FPGAs. For partitions in which trace and injection logic are included, the bit files also describe the logic that is included. The bit files can include place and route information and design constraints. The host system stores the bit files and information describing which FPGAs are to emulate each component of the DUT (e.g., to which FPGAs each component is mapped).

Upon request, the host system transmits the bit files to the emulator. The host system signals the emulator to start the emulation of the DUT. During emulation of the DUT or at the end of the emulation, the host system receives emulation results from the emulator through the emulation connection. Emulation results are data and information generated by the emulator during the emulation of the DUT, which includes interface signals and states of interface signals that have been traced by the trace and injection logic of each FPGA. The host system can store the emulation results and/or transmits the emulation results to another processing system.

After emulation of the DUT, a circuit designer can request to debug a component of the DUT. If such a request is made, the circuit designer can specify a time period of the emulation to debug. The host system identifies which FPGAs are emulating the component using the stored information. The host system retrieves stored interface signals associated with the time period and traced by the trace and injection logic of each identified FPGA. The host system signals the emulator to re-emulate the identified FPGAs. The host system transmits the retrieved interface signals to the emulator to re-emulate the component for the specified time period. The trace and injection logic of each identified FPGA injects its respective interface signals received from the host system into the logic of the DUT mapped to the FPGA. In the case of multiple re-emulations of an FPGA, merging the results produces a full debug view.

The host system receives, from the emulation system, signals traced by the logic of the identified FPGAs during the re-emulation of the component. The host system stores the signals received from the emulator. The signals traced during the re-emulation can have a higher sampling rate than the sampling rate during the initial emulation. For example, in the initial emulation, a traced signal can include a saved state of the component every X milliseconds. However, in the re-emulation, the traced signal can include a saved state every Y milliseconds where Y is less than X. If the circuit designer requests to view a waveform of a signal traced during the re-emulation, the host system can retrieve the stored signal and display a plot of the signal. For example, the host system can generate a waveform of the signal. Afterward, the circuit designer can request to re-emulate the same component for a different time period or to re-emulate another component.

A host system 1207 and/or the compiler 1210 may include subsystems such as, but not limited to, a design synthesizer sub-system, a mapping sub-system, a run time sub-system, a results sub-system, a debug sub-system, a waveform sub-system, and a storage sub-system. The sub-systems can be structured and enabled as an individual or multiple modules, or two or more may be structured as a module. Together these sub-systems structure the emulator and monitor the emulation results.

The design synthesizer sub-system transforms the HDL that is representing a DUT 1205 into gate-level logic. For a DUT that is to be emulated, the design synthesizer sub-system receives a description of the DUT. If the description of the DUT is fully or partially in HDL (e.g., RTL or another level of abstraction), the design synthesizer sub-system synthesizes the HDL of the DUT to create a gate-level netlist with a description of the DUT in terms of gate-level logic.

The mapping sub-system partitions DUTs and maps the partitions into emulator FPGAs. The mapping sub-system partitions a DUT at the gate level into a number of partitions using the netlist of the DUT. For each partition, the mapping sub-system retrieves a gate-level description of the trace and injection logic and adds the logic to the partition. As described above, the trace and injection logic included in a partition is used to trace signals exchanged via the interfaces of an FPGA to which the partition is mapped (trace interface signals). The trace and injection logic can be added to the DUT prior to the partitioning. For example, the trace and injection logic can be added by the design synthesizer sub-system prior to or after the synthesizing the HDL of the DUT.

In addition to including the trace and injection logic, the mapping sub-system can include additional tracing logic in a partition to trace the states of certain DUT components that are not traced by the trace and injection. The mapping sub-system can include the additional tracing logic in the DUT prior to the partitioning or in partitions after the partitioning. The design synthesizer sub-system can include the additional tracing logic in an HDL description of the DUT prior to synthesizing the HDL description.

The mapping sub-system maps each partition of the DUT to an FPGA of the emulator. For partitioning and mapping, the mapping sub-system uses design rules, design constraints (e.g., timing or logic constraints), and information about the emulator. For components of the DUT, the mapping sub-system stores information in the storage sub-system describing which FPGAs are to emulate each component.

Using the partitioning and the mapping, the mapping sub-system generates one or more bit files that describe the created partitions and the mapping of logic to each FPGA of the emulator. The bit files can include additional information such as constraints of the DUT and routing information of connections between FPGAs and connections within each FPGA. The mapping sub-system can generate a bit file for each partition of the DUT and can store the bit file in the storage sub-system. Upon request from a circuit designer, the mapping sub-system transmits the bit files to the emulator, and the emulator can use the bit files to structure the FPGAs to emulate the DUT.

If the emulator includes specialized ASICs that include the trace and injection logic, the mapping sub-system can generate a specific structure that connects the specialized ASICs to the DUT. In some embodiments, the mapping sub-system can save the information of the traced/injected signal and where the information is stored on the specialized ASIC.

The run time sub-system controls emulations performed by the emulator. The run time sub-system can cause the emulator to start or stop executing emulation. Additionally, the run time sub-system can provide input signals and data to the emulator. The input signals can be provided directly to the emulator through the connection or indirectly through other input signal devices. For example, the host system can control an input signal device to provide the input signals to the emulator. The input signal device can be, for example, a test board (directly or through cables), a signal generator, another emulator, or another host system.

The results sub-system processes emulation results generated by the emulator. During emulation and/or after completing the emulation, the results sub-system receives emulation results from the emulator generated during the emulation. The emulation results include signals traced during the emulation. Specifically, the emulation results include interface signals traced by the trace and injection logic emulated by each FPGA and can include signals traced by additional logic included in the DUT. Each traced signal can span multiple cycles of the emulation. A traced signal includes multiple states, and each state is associated with a time of the emulation. The results sub-system stores the traced signals in the storage sub-system. For each stored signal, the results sub-system can store information indicating which FPGA generated the traced signal.

The debug sub-system allows circuit designers to debug DUT components. After the emulator has emulated a DUT and the results sub-system has received the interface signals traced by the trace and injection logic during the emulation, a circuit designer can request to debug a component of the DUT by re-emulating the component for a specific time period. In a request to debug a component, the circuit designer identifies the component and indicates a time period of the emulation to debug. The circuit designer's request can include a sampling rate that indicates how often states of debugged components should be saved by logic that traces signals.

The debug sub-system identifies one or more FPGAs of the emulator that are emulating the component using the information stored by the mapping sub-system in the storage sub-system. For each identified FPGA, the debug sub-system retrieves, from the storage sub-system, interface signals traced by the trace and injection logic of the FPGA during the time period indicated by the circuit designer. For example, the debug sub-system retrieves states traced by the trace and injection logic that is associated with the time period.

The debug sub-system transmits the retrieved interface signals to the emulator. The debug sub-system instructs the debug sub-system to use the identified FPGAs and for the trace and injection logic of each identified FPGA to inject its respective traced signals into the logic of the FPGA to re-emulate the component for the requested time period. The debug sub-system can further transmit the sampling rate provided by the circuit designer to the emulator so that the tracing logic traces states at the proper intervals.

To debug the component, the emulator can use the FPGAs to which the component has been mapped. Additionally, the re-emulation of the component can be performed at any point specified by the circuit designer.

For an identified FPGA, the debug sub-system can transmit instructions to the emulator to load multiple emulator FPGAs with the same configuration of the identified FPGA. The debug sub-system additionally signals the emulator to use the multiple FPGAs in parallel. Each FPGA from the multiple FPGAs is used with a different time window of the interface signals to generate a larger time window in a shorter amount of time. For example, the identified FPGA can require an hour or more to use a certain amount of cycles. However, if multiple FPGAs have the same data and structure of the identified FPGA and each of these FPGAs runs a subset of the cycles, the emulator can require a few minutes for the FPGAs to use all the cycles collectively.

A circuit designer can identify a hierarchy or a list of DUT signals to re-emulate. To enable this, the debug sub-system determines the FPGA needed to emulate the hierarchy or list of signals, retrieves the necessary interface signals, and transmits the retrieved interface signals to the emulator for re-emulation. Thus, a circuit designer can identify any element (e.g., component, device, or signal) of the DUT to debug/re-emulate.

The waveform sub-system generates waveforms using the traced signals. If a circuit designer requests to view a waveform of a signal traced during an emulation run, the host system retrieves the signal from the storage sub-system. The waveform sub-system displays a plot of the signal. For one or more signals, when the signals are received from the emulator, the waveform sub-system can automatically generate the plots of the signals.

Figure 13:
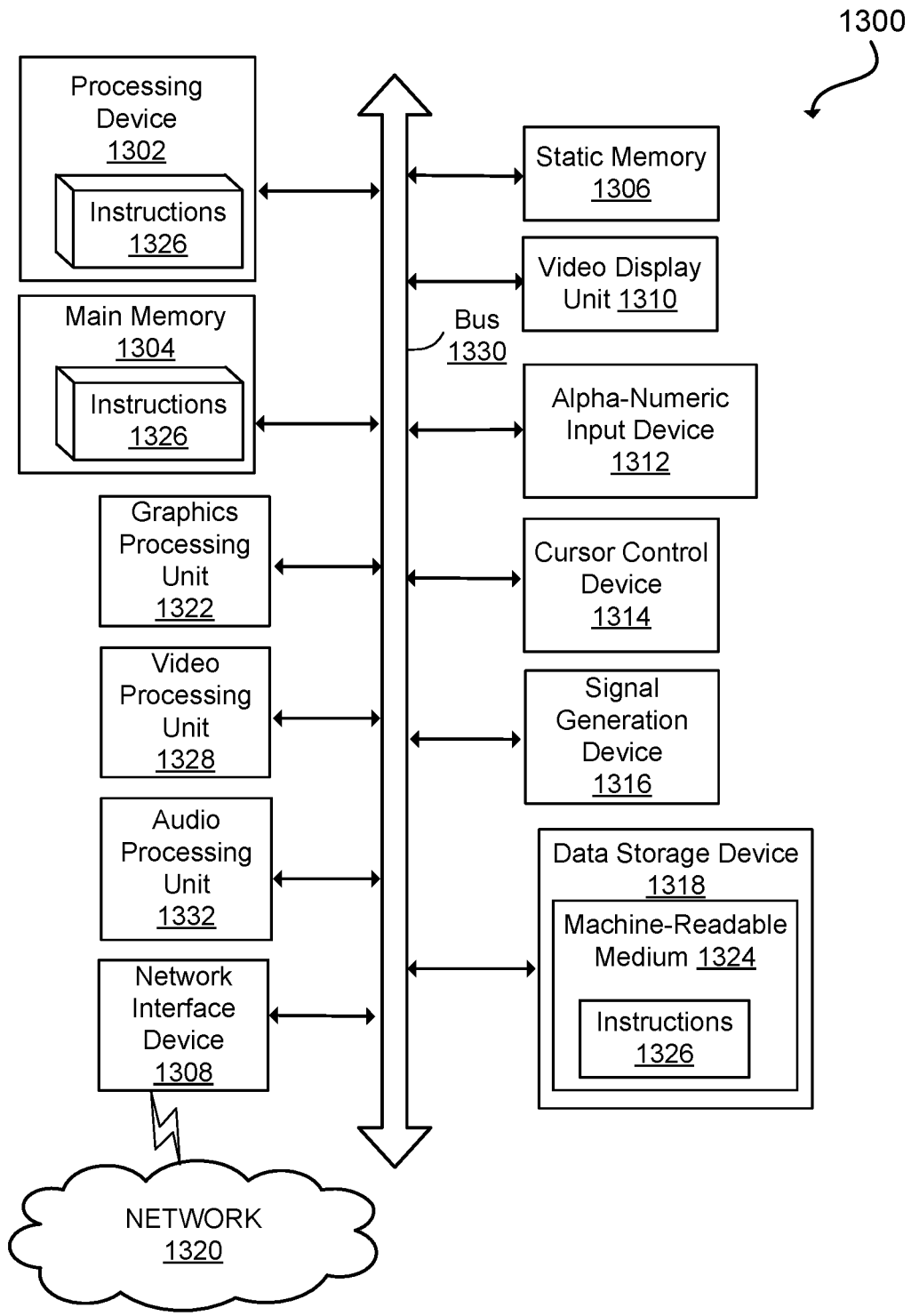
FIG. 13 illustrates a diagram of an example computer system in which embodiments of the present disclosure may operate.

FIG. 13 illustrates an example machine of a computer system 1300 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in a client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1300 includes a processing device 1302, a main memory 1304 (e.g., read-only memory (ROM), flash memory, dynamic random access memory (DRAM) such as synchronous DRAM (SDRAM), a static memory 1306 (e.g., flash memory, static random access memory (SRAM), etc.), and a data storage device 1318, which communicate with each other via a bus 1330.

The processing device 1302 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 1302 may also be one or more special-purpose processing devices such as an application-specific integrated circuit (ASIC), a field-programmable gate array (FPGA), a digital signal processor (DSP), network processor, or the like. The processing device 1302 may be configured to execute instructions 1326 for performing the operations and steps described herein.

The computer system 1300 may further include a network interface device 1308 to communicate over the network 1320. The computer system 1300 also may include a video display unit 1310 (e.g., a liquid crystal display (LCD) or a cathode ray tube (CRT)), an alphanumeric input device 1312 (e.g., a keyboard), a cursor control device 1314 (e.g., a mouse), a graphics processing unit 1322, a signal generation device 1316 (e.g., a speaker), graphics processing unit 1322, video processing unit 1328, and audio processing unit 1332.

The data storage device 1318 may include a machine-readable storage medium 1324 (also known as a non-transitory computer-readable medium) on which is stored one or more sets of instructions 1326 or software embodying any one or more of the methodologies or functions described herein. The instructions 1326 may also reside, completely or at least partially, within the main memory 1304 and/or within the processing device 1302 during execution thereof by the computer system 1300, the main memory 1304, and the processing device 1302 also constituting machine-readable storage media.

In some implementations, the instructions 1326 include instructions to implement functionality corresponding to the present disclosure. While the machine-readable storage medium 1324 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 1302 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to convey the substance of their work to others skilled in the art most effectively. An algorithm may be a sequence of operations leading to the desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer-readable storage medium, such as but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure, as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as read-only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures, and like elements are labeled with like numerals. The disclosure and drawings are, accordingly, to be regarded in an illustrative sense rather than a restrictive sense.

What is claimed is:

1. A method, comprising:
  computing, by one or more processing devices, a time delay for each path of a plurality of paths of a circuit design;
  determining, by the one or more processing devices, a commonality score based on a number of segments that are common between the plurality of paths of the circuit design, the commonality score being proportional to the number of segments that are common between the plurality of paths;
  determining, by the one or more processing devices, a criticality score based on the time delay for each path of the plurality of paths of the circuit design, the criticality score being proportional to the time delay;
  generating, by the one or more processing devices, a graphical representation of the plurality of paths, wherein a first dimension of the graphical representation corresponds to the commonality score and wherein a second dimension of the graphical representation corresponds to the criticality score; and providing, by the one or more processing devices, the graphical representation of the plurality of paths in a graphical user interface (GUI) to represent the plurality of paths in the circuit design.

2. The method of claim 1, wherein the graphical representation comprises one or more of severity of each path of the plurality of paths, endpoints associated with each path, and time per width for a sub-path of a path of the plurality of paths, wherein the plurality of paths are predetermined based on the criticality score or the commonality score.

3. The method of claim 1, further comprising generating, by the one or more processing devices, the graphical representation based on a plurality of records stored in a database, wherein the plurality of records are generated during emulation of the circuit design, wherein the representing the plurality of paths using the graphical representation further comprises generating, by the one or more processing devices, based on the plurality of records stored in the database, a corresponding plurality of views for display in the graphical user interface (GUI), and wherein each view of the plurality of views displays information representing a different aspect of a plurality of aspects of the circuit design.

4. The method of claim 3, wherein the plurality of views comprises global timing view, hardware view, tabular path view, schematic path view, and source code view, wherein a first view of the plurality of views is linked to a second view of the plurality of views, and wherein the first view is different from the second view.

5. The method of claim 3, further comprising recording, by the one or more processing devices, one or more user actions in the database to allow revisiting between the plurality of views.

6. The method of claim 3, wherein the plurality of views are synchronized to one another, and wherein an action to select any one view of the plurality of views results in automatic contextual selection of another view of the plurality of views.

7. The method of claim 3, further comprising receiving by the one or more processing devices, an input from a user via the GUI to perform an action on a selected portion of a view of the plurality of views that represents a portion of an aspect of the plurality of aspects of the circuit design, wherein the aspect comprises at least one of global timing information, timing path information in design context, timing path information in hardware context, and source code information.

8. The method of claim 7, wherein the action comprises expanding or collapsing the selected portion of the view.

9. The method of claim 7, wherein the action on a hardware view of the plurality of views comprises interactively zooming-in along a hardware hierarchy of the circuit design across a timing path.

10. The method of claim 7, wherein the action comprises generating one or more reports corresponding to the plurality of records.

11. The method of claim 6, wherein the action comprises modifying a GUI annotation across the view through an interactive interface.

12. The method of claim 11, wherein the GUI annotation highlights a problem area across the view.

13. A system, comprising:
a memory for storing operations; and
one or more processors, communicatively coupled to the memory, configured to perform the operations comprising:
computing a time delay for each path of a plurality of paths of a circuit design;
determining, a commonality score based on a number of segments that are common between the plurality of paths of the circuit design, the commonality score being proportional to the number of segments that are common between the plurality of paths;
determining, a criticality score based on the time delay for each path of the plurality of paths of the circuit design, the criticality score being proportional to the time delay;
generating, a graphical representation of the plurality of paths, wherein a first dimension of the graphical representation corresponds to the commonality score and wherein a second dimension of the graphical representation corresponds to the criticality score; and
providing, the graphical representation of the plurality of paths in a graphical user interface (GUI) to represent the plurality of paths in the circuit design.

14. The system of claim 13, wherein the graphical representation comprises one or more of severity of each path of the plurality of paths, endpoints associated with each path, and time per width for a sub-path of a path of the plurality of paths, wherein the plurality of paths are predetermined based on the criticality score or the commonality score.

15. The system of claim 13, wherein the operations further comprise:
generating the graphical representation based on a plurality of records stored in a database, wherein the plurality of records are generated during emulation of the circuit design,
wherein the representing the plurality of paths using the graphical representation further comprises generating, based on the plurality of records stored in the database, a corresponding plurality of views for display in the graphical user interface (GUI), and
wherein each view of the plurality of views displays information representing a different aspect of a plurality of aspects of the circuit design.

16. The system of claim 15, wherein the plurality of views comprises global timing view, hardware view, tabular path view, schematic path view, and source code view, wherein a first view of the plurality of views is linked of a second view of the plurality of views, and wherein the first view is different from the second view.

17. The system of claim 16, wherein an action on the hardware view of the plurality of views comprises interactively zooming-in along hardware hierarchy of the circuit design across timing path.

18. The system of claim 15, wherein the plurality of views are synchronized to one another, and wherein an action to select any one view of the plurality of views results in automatic contextual selection of another view of the plurality of views.

19. The system of claim 15, wherein the operations further comprise:
receiving an input from a user via the GUI to perform an action on a selected portion of a view of the plurality of views that represents a portion of an aspect of the plurality of aspects of the circuit design, wherein the aspect comprises at least one of global timing information, timing path information in design context, timing path information in hardware context, and source code information, and wherein the action comprises expanding or collapsing the selected portion of the view.

20. A non-transitory, tangible computer-readable device having instructions stored thereon that, when executed by at least one computing device, causes the at least one computing device to perform operations comprising:

computing a time delay for each path of a plurality of paths of a circuit design;

determining a commonality score based on a number of segments that are common between the plurality of paths of the circuit design, the commonality score being proportional to the number of segments that are common between the plurality of paths;

determining a criticality score based on the time delay for each path of the plurality of paths of the circuit design, the criticality score being proportional to the time delay;

generating a graphical representation of the plurality of paths, wherein a first dimension of the graphical representation corresponds to the commonality score and wherein a second dimension of the graphical representation corresponds to the criticality score; and providing the graphical representation of the plurality of paths in a graphical user interface (GUI) to represent the plurality of paths in the circuit design.

* * * * *